United States Patent
Angelo et al.

[11] Patent Number: 5,859,911
[45] Date of Patent: Jan. 12, 1999

[54] METHOD FOR THE SECURE REMOTE FLASHING OF THE BIOS OF A COMPUTER

[75] Inventors: Michael F. Angelo, Houston; Sompong P. Olarig, Cypress; George D. Wisecup, Houston, all of Tex.

[73] Assignee: Compaq Computer Corp., Houston, Tex.

[21] Appl. No.: 840,795

[22] Filed: Apr. 16, 1997

[51] Int. Cl.$^6$ .................................................. H04K 1/00
[52] U.S. Cl. .................................................. 380/25
[58] Field of Search ................. 380/25, 49, 23, 380/24, 52

[56] References Cited

U.S. PATENT DOCUMENTS

| | | | |
|---|---|---|---|
| 5,440,632 | 8/1995 | Bacon et al. | 380/20 |
| 5,444,850 | 8/1995 | Chang | 380/23 |
| 5,734,819 | 3/1998 | Lewis | 380/45 |
| 5,787,367 | 7/1998 | Berra | 380/23 |

*Primary Examiner*—David Cain
*Attorney, Agent, or Firm*—Jenkens & Gilchrist; Craig A. Hoersten

[57] ABSTRACT

In a computer system having a receiving computer and a source computer, a method for the remote flashing of the BIOS in the receiving computer including the steps of transferring the flash information from the source computer to the receiving computer, with the flash information including the flash code, the flash code instructions and an encrypted digital signature corresponding to the flash code. The receiving computer is operably placed in a secure mode. A hash value corresponding to the flash information is calculated, and the hash value from the flash information is decrypted. The flash code is validated by comparing the decrypted hash value of the flash information to the calculated hash value, and if validated, the BIOS if flashed with the new flash code.

14 Claims, 6 Drawing Sheets

METHOD FOR THE SECURE REMOTE FLASHING OF THE BIOS OF A COMPUTER

FIELD OF THE INVENTION

The present invention relates to methods for ensuring the integrity of information transmitted from one computer to another such as over a network system, and more particularly, but not by way of limitation, to a method for ensuring the integrity of a BIOS flash transmitted from one computer to another.

BACKGROUND OF THE INVENTION

The Basic Input/Output System (BIOS) of a computer is the backbone of the operation of that computer. The BIOS is programming that controls the basic hardware operations of the computer, including interaction with floppy disk drives, hard disk drives and the keyboard. Because of the ever changing computer technologies, even though a computer may still be acceptable to a user, often the BIOS of that computer will not support all of the new technologies.

Clearly, one of the conventional ways of upgrading the BIOS programming or image of a computer is to physically replace the Read-Only-Memory (ROM) based BIOS, which in networks systems, would entail replacing the ROM-BIOS in each processor node, which is very time consuming and adds to the overall system down-time of the network.

There have been solutions for updating a BIOS image associated with a processor without having to physically replace the ROM-BIOS at each computer in the network. For example, one solution is to provide the computer with a Flash EPROM for the BIOS, also known as a Flash BIOS. With a Flash BIOS, the BIOS image or a portion of the BIOS image can be updated by a software update. This is often performed by downloading or storing the Flash information onto a media storage device, such as a floppy disk, and using the disk at each computer to flash the BIOS thereof As can be appreciated, this is very time consuming, especially with large network systems. Further, some of the computers on the network may not have floppy drives or the proper medium transfer device.

A second method is to send the flash over the network to each computer in the network. The problem with this method is that the flash is subject to someone introducing malicious code, such as a virus, to the flash, thereby causing the BIOS to be flashed with a corrupt image.

SUMMARY OF THE INVENTION

The present invention overcomes the above identified problems as well as other shortcomings and deficiencies of existing technologies by providing a method for ensuring the integrity of a remote BIOS flash transmitted from a source computer to a receiving computer.

The present invention further provides a method used in a computer system having a receiving computer and a source computer, for the remote flashing of the BIOS in the receiving computer. The method includes the steps of transferring the flash information from the source computer to the receiving computer, with the flash information including the flash code, the flash code instructions and an encrypted digital signature corresponding to the identification of the flash code. The sender is authenticated and then the receiving computer is operably placed in a secure mode. A hash value corresponding to the flash information is calculated, and the digital signature from the flash information is decrypted. The flash code is validated by comparing the digital signature of the flash information to the calculated hash, and if validated, the BIOS if flashed with the new flash code, the new flash code is verified, and the computer re-booted power cycled.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
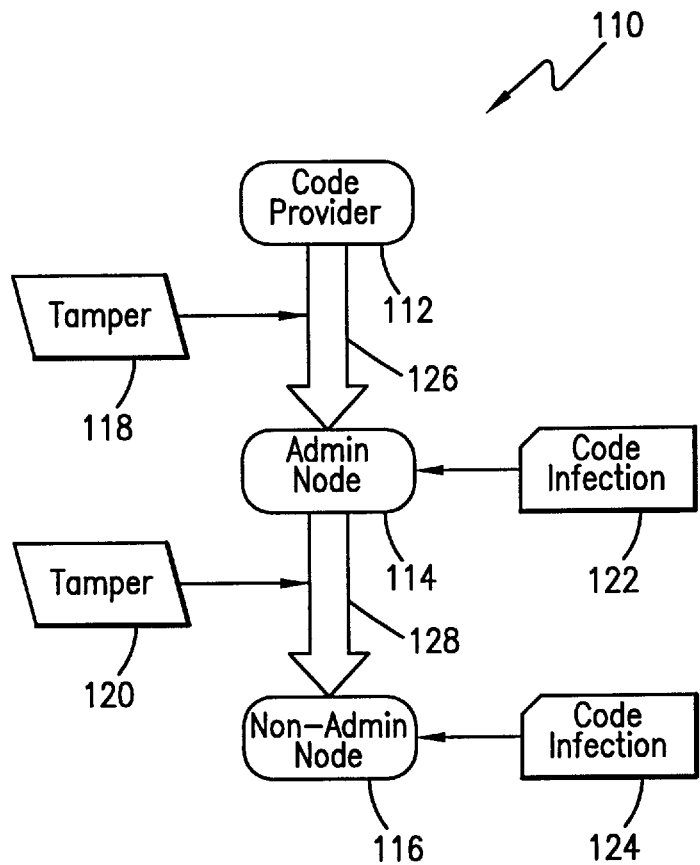
FIG. 1 is a schematic block diagram of information flow from a code provider to a plurality of nodes and also of exemplary modes of code corruption.

Referring now to FIG. 1, there is shown a schematic block diagram 110 illustrating information flow from a code provider 112 to multiple nodes 114 and 116 for a computer system utilizing the present invention. There is further depicted exemplary modes of code corruption 118, 120, 122 and 124.

Nodes 114 and 116 preferably comprise at least a processor unit that may be coupled to a storage unit. It is contemplated that the multiple nodes may be configured in any know topological architecture, for example the mesh, ring, torus, star or the hypercube architectures. It should be further understood that the multiple nodes may be configured in any know scalable processing environment, such as the shared memory, cluster-type, shared device, or a system area network (SAN) environment.

When multiple nodes are connected in a network, one or more of the nodes will generally be endowed with "network-aware" or "cluster-aware" capability. Such nodes are often referred to as administrator nodes. For example, in a SAN environment, and administrator node is typically provided with a SAN manager, a software structure that initializes the system and resource configuration of the network upon power-up.

Continuing to refer to FIG. 1, when code information is transmitted from the code provider 112 to one or more of the nodes, which may be arranged in a network configuration, the information is typically received first by the administrator node 114 via data path 126. It is contemplated that data path 126 may represent either manual transfer of code information stored on medium such as floppy disks, CDs, or the like; or automatic transfer thereof by means of data communication from a remote site owned or controlled by the code provider 112. The automatic transfer of code information may, for example, comprise a file transfer protocol (ftp) down-load from the code provider 112, such as over the internet.

Still referring to FIG. 1, the data or code information transmitted from the code provider 112 preferably comprises update information for updating at least a portion of the Basic Input/Output System (BIOS) image associated with one or more of nodes 114 and 116. The BIOS update information is commonly referred to as BIOS flash information. As this information is used to overwrite at least a portion of the existing BIOS, the integrity of the BIOS flash information transmitted from the code provider 112 is very critical. The BIOS flash information could be compromised from tamper sources 118 and 120, or from code infection sources 122 and 124 such as with "software viruses". It is because of these potential problems that the present invention is so paramount.

Figure 2:
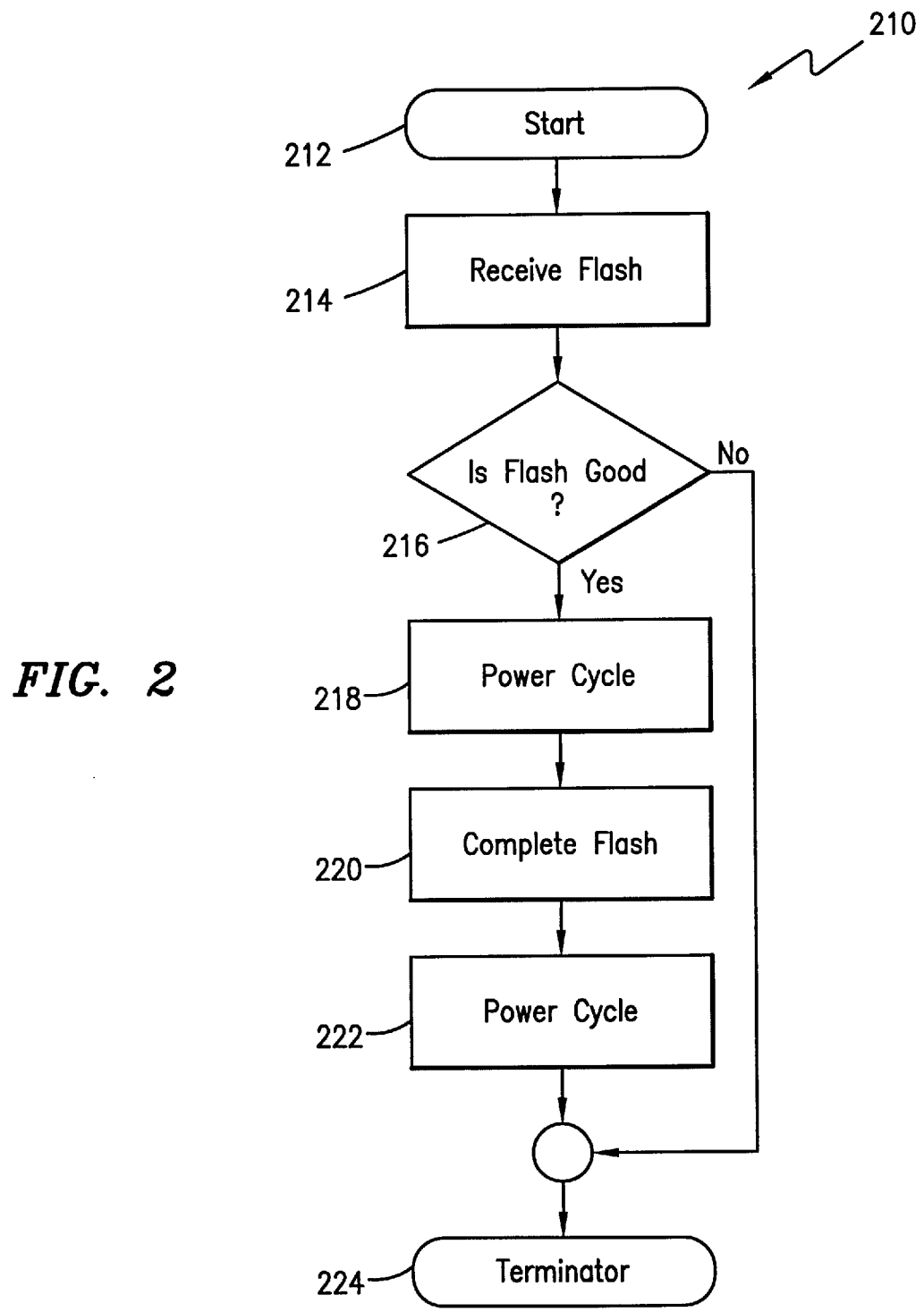
FIG. 2 is an exemplary block flow diagram of a presently preferred embodiment of the method of the present invention for the secure remote flashing of the BIOS of a computer.

Referring now to FIG. 2, there is shown a block flow diagram 210 illustrating a method of the present invention for the secure remote flashing of a BIOS in a computer system such as illustrated in FIG. 1. First as indicated by start block 212, the procedure begins with the code provider/sending computer transmitting the flash BIOS information to a receiving computer. Thereafter, as indicated by block 214 the receiving computer receives the flash information and stores the flash information such as onto a fixed disk partition or in NVRAM. Then, as indicated by block 216, the flash information received in the receiving computer is subjected to a validation process, an example of which is described in more detail below. If the determination is made that the flash information is not valid, i.e. the flash information has been tampered with or modified, then the "no" branch is followed and the BIOS flashing is not carried out and the procedure terminated. If, however, the determination is made that the flash information is good or valid, the "yes" branch is followed. Then as indicated by block 218, the receiving computer is placed in a predetermined operating state, such as by going through a cold boot power cycle. As described above, the flash information is stored in the receiving computer in a manner such that it is not lost or deleted during the power cycle. Then as indicated by block 220, the BIOS flash is carried out. Subsequently, as indicated by block 222, the receiving computer is re-booted, such a by going through another power cycle, and the BIOS information is enabled.

Figure 3:
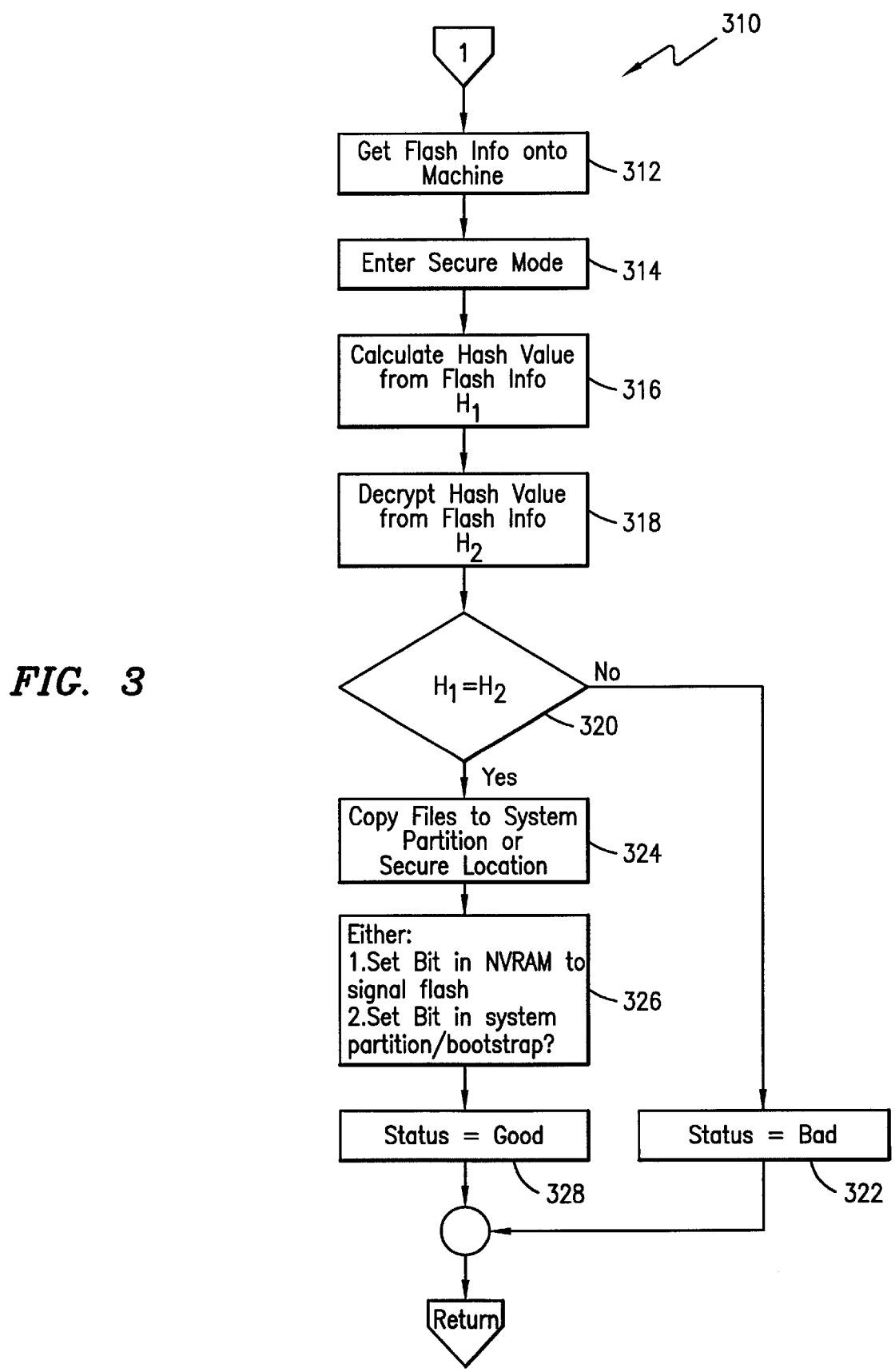
FIG. 3 is a block flow diagram for validating the flash code and the signaling that a flash is desired.

Referring now to FIG. 3, there is illustrated a block flow diagram 310 illustrating an exemplary method for validating of the flash code and for signaling that a flash is desired in accordance with the principles of the present invention. As indicated by block 312, the flash BIOS information received from the sending computer is loaded into the receiving computer. Then as indicated by block 314, the receiving computer enters a secure mode of operation. This can be accomplished by any of a number of procedures, such as described below in reference to FIG. 4, or by generating a System Management Interrupt (SMI) or by those described in U.S. Pat. No. 5,421,006, entitled "Method and Apparatus for Assessing Integrity of Computer System Software".

Still referring to FIG. 3, after the receiving computer has entered the secured mode, a hash value is calculated from the flash information, as indicated by block 316. Then, as indicated by block 318, a hash value that has been encrypted in the flash information prior to the information being transferred from the sending computer, is decrypted and compared with the calculated hash value (block 320). If the calculated hash value and the decrypted hash value do not match, the "no" branch is followed, wherein the status of the flash information is determined to be "bad" or invalid (block 322). If the calculated hash value and the decrypted hash value do match, the "yes" branch is followed to bock 324, where the files of the flash information are then copied to a system partition. Then as indicated by block 326, an indication is established that a flash is desired, such as by setting a bit in the NVRAM to signal a flash, or by setting a bit in the system partition or bootstrap to signal a flash. Then, as indicated by block 328, the flash information is validated and can be used to flash the BIOS. Good results have also been achieved in the step of block 312 by also checking the validation of the sending computer for authorization of being able to send the flash information to the receiving computer. If the sending computer is not authenticated, the procedure is terminated. One method of validating the sending computer utilizes a method for digitally signing code information. Prior to sending the information, the sender generates an information-integrity-code ("IIC") associated with the coded information to be transmitted, such as a checksum. The IIC is then encrypted using a encryption scheme, such as a public key/private key encryption. The encrypted IIC is then attached to the coded information and is transmitted to the receiver. The receiver generates a second IIC associated with the coded information. Then, the received IIC in the encrypted form is decrypted by the receiver. The generated second IIC is then compared to the decrypted IIC. If the two match, the validation is successful.

Figure 4:
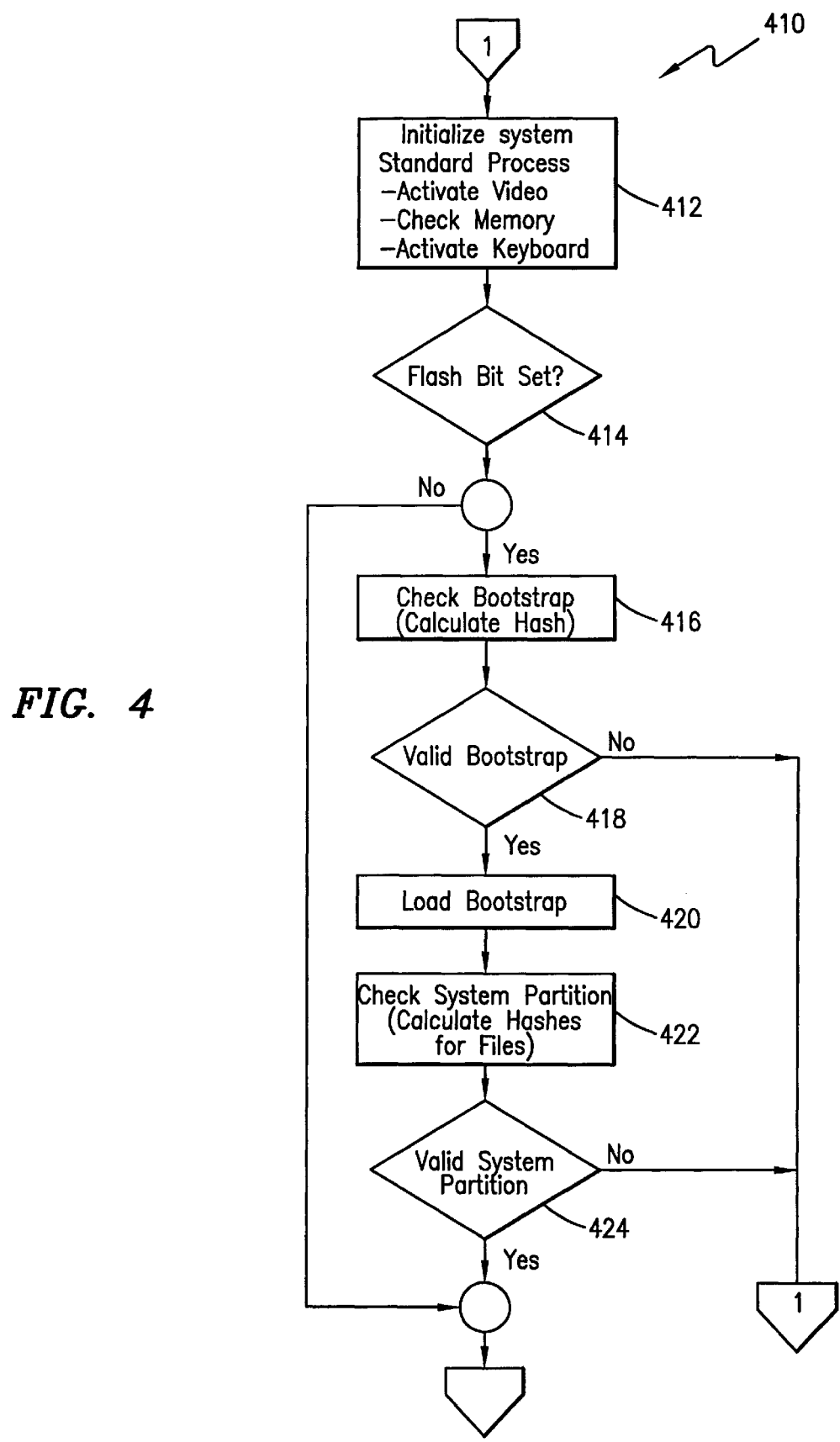
FIG. 4 is a block flow diagram for entering a secure mode in a system to receive a remote flashing of the BIOS.

Referring now to FIG. 4, there is illustrated a block flow diagram 410 for entering a secure mode in the receiving computer to receive a remote flashing of the BIOS in accordance with the principles of the present invention. Good results have been achieved for performing the steps of block flow diagram 410 during a power cycle of the computer. As depicted in block 412, the computer cycles through an initialize system standard process, where the video and keyboard are activated and the memory is checked. Then, as indicated by block 414, the computer checks to determine if the flash bit is set. If the flash bit is not set, the "no" branch is followed and the procedure terminated. If the flash bit is set, the "yes" branch is followed and a hash value is calculated for the bootstrap of the receiving computer as indicated in block 416. Then, as indicated in block 418, the validity of the bootstrap is checked, by comparing the calculated hash value with the known value. If the bootstrap is not valid, the no branch is followed and the procedure is terminated. If the bootstrap is valid, the yes branch is followed, and, as indicated by block 420 the bootstrap is loaded. Next, as indicated by blocks 422 and 424, hash values for system partition files are calculated and compared with known values, so that the system partition files can be validated. If the system partition files are not validated, the "no" branch is followed and the procedure terminated. If validated, the receiving computer is placed is in a secure mode. Good results have also been achieved by further performing the steps of locating and validating both the system partitions and the flash application subsequent to block 414.

Figure 5:
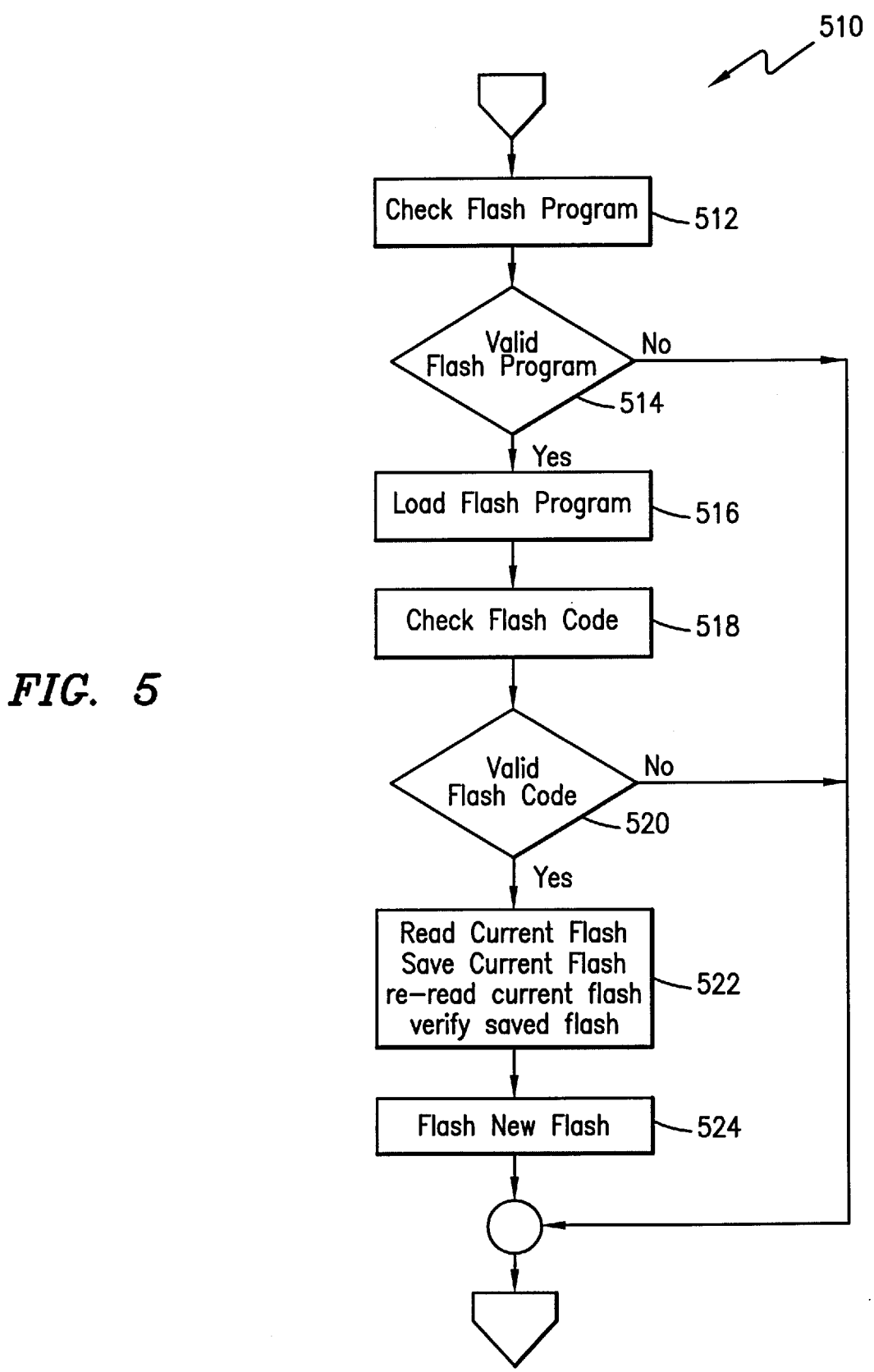
FIG. 5 is a block flow diagram for loading, checking and flashing a BIOS flash code.

Referring now to FIG. 5, there is illustrated a block flow diagram 510 for loading, checking, and flashing a BIOS flash code in the receiving computer in accordance with the principles of the present invention. As indicated by blocks 512 and 514, when the receiving computer has received the flash program, the program is checked, such as with a cyclic redundancy check (CRC), a secure hash algorithm (SHA), or a cryptographic checksum, and then validated, such as described above. If the flash program is not valid, the "no" branch from block 514 if followed and the procedure terminated. It the flash program is valid, the "yes" branch from block 514 is followed, and as indicated by block 516, the flash program is loaded by the receiving computer, such as into NVRAM or on a disk partition. Then, as indicated by blocks 518 and 520, the flash code is checked and validated.

If the flash code is not valid, the "no" branch from block 520 is followed and the procedure is terminated. If the flash code is valid, the "yes" branch from block 520 is followed. Subsequently, as indicated by block 522, the current flash is read and saved. The current flash is re-read, and used to verify the saved current flash. Thereafter, as indicated by block 524, the new flash is flashed.

Figure 6:
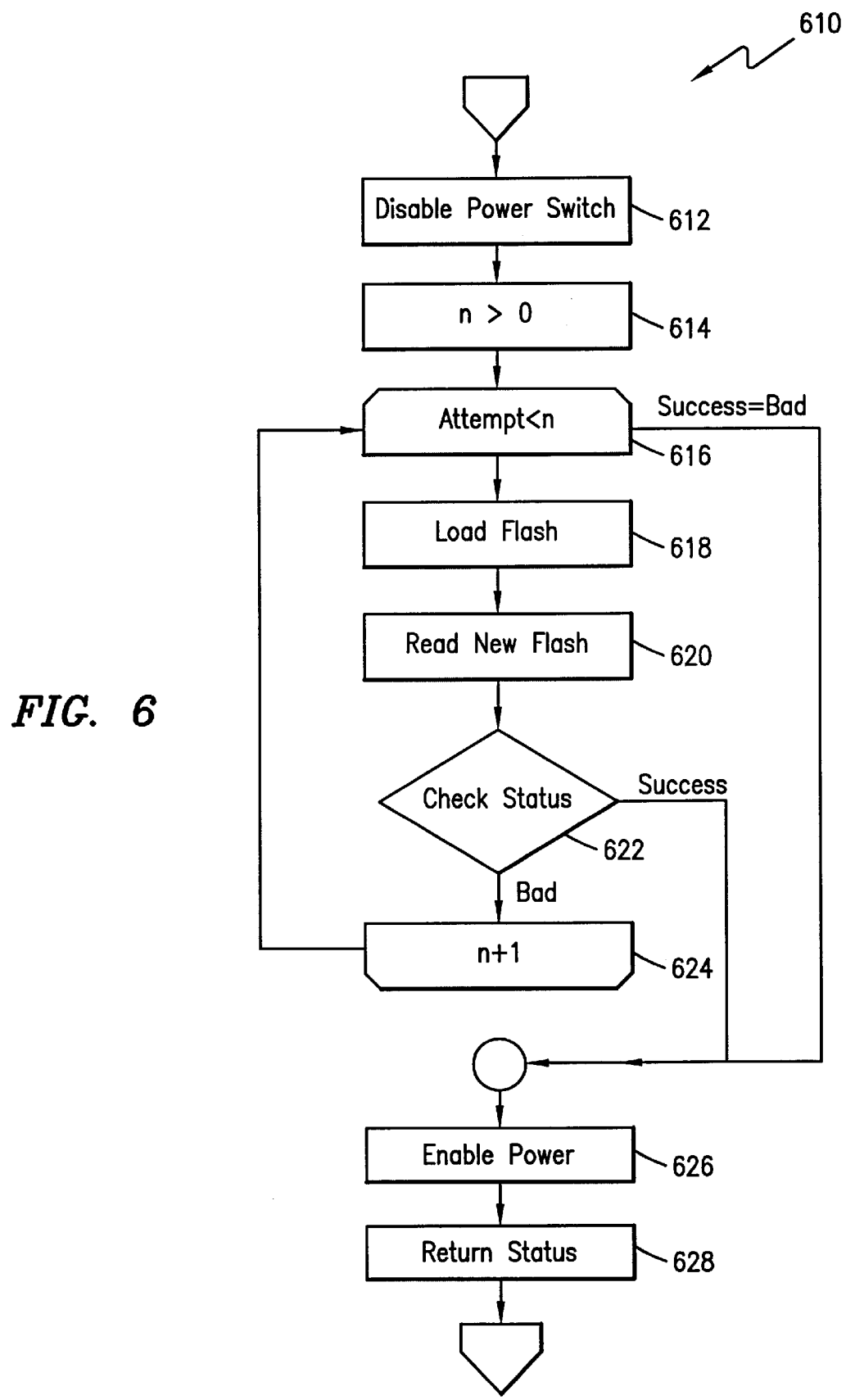
FIG. 6 is a block flow diagram for a procedure used to load and read a BIOS flash code.

Referring now to FIG. 6, there is illustrated a block flow diagram 610 for the flashing of the newly loaded BIOS flash in the receiving computer. As depicted by block 612, the "power switch" is disabled, preventing the receiving computer from acting upon any power-on-reset signals received or generated therein. This prevents the receiving computer from power cycling in the middle of flashing. Block 614 indicates the number permitted attempts for performing the flash. Block 616 determines if the permitted number of attempts has been exceeded. If the maximum number of attempts has been exceeded, the success of the flashing is determined to be bad, and the procedure proceeds to block 626. If the maximum number of attempts has not been exceeded, the flash is loaded, read and checked as indicated by blocks 618, 620 and 622. If the status of the new flash has been determined to be successful, the "success" branch is followed from block 622, proceeding to block 626. If the status of the new flash has been determined not be successful, the number of attempts is incremented by one (block 624), and the procedure returns back to block 616. Subsequently, when block 626 has been reached, the "power switch" is enabled and the procedure terminated (block 628).

Those skilled in the art can realize that the teachings of the present invention as described hereinabove provide and effective method for the secure remote flashing of the BIOS of a computer. It can be further appreciated that the present invention provides a method for transmitting flash information from a transmitting computer to a receiving computer, such as in a network configuration, and for guaranteeing the integrity of the flash information, such that if any viruses are introduced into the flash, the virus infected flash will not be used in updating a computers BIOS.

Although a preferred embodiment of the method of the present invention has been illustrated in the accompanying Drawings and described in the foregoing Detailed Description, it will be understood that the invention is not limited to the embodiment disclosed, but is capable of numerous rearrangements, modifications and substitutions without departing form the spirit of the invention as set forth and defined by the following claims.

What is claimed is:

1. A method for flashing an EPROM in a receiving computer with a flash code transmitted to the receiving computer from a source computer, said method comprising the steps of:

receiving the flash code transmitted from the source computer into the receiving computer;

validating the flash code in the receiving computer;

changing the receiving computer to a selected operating state;

flashing the EPROM in the receiving computer with the validated flash code; and power cycling the receiving computer.

2. The method as recited in claim 1, wherein said step of changing the receiving computer to a selected operating state includes the step of power cycling the receiving computer.

3. The method as recited in claim 1, further comprising the step of validating the source computer for authorization to transmit the flash code to the receiving computer.

4. The method as recited in claim 1, prior to said step of flashing the EPROM in the receiving computer with the validated flash code, further comprising the steps of:

reading the current EPROM flash;

saving the current EPROM flash;

re-reading the current EPROM flash; and verifying the saved current EPROM flash.

5. The method as recited in claim 1, wherein the step of validating the flash code in the receiving computer includes the steps of;

changing the receiving computer into a secure mode;

calculating a hash from the flash code;

decrypting a hash from the flash code;

comparing the hash calculated from the flash code with the hash decrypted from the flash code; and validating the flash code if the calculated hash is equal to the decrypted hash.

6. In a computer system having a receiving computer and a source computer, a method for the remote flashing of the BIOS in the receiving computer comprising the steps of:

transferring the flash information from the source computer to the receiving computer, wherein the flash information includes the flash code, flash code instructions and an encrypted digital signature;

placing the receiving computer in a secure mode;

calculating a hash value from the flash information;

decrypting the hash value from the flash information;

comparing the calculated hash value with the decrypted hash value; and flashing the BIOS in the receiving computer if the calculated hash value and the decrypted hash value match.

7. The method as recited in claim 6, further comprising the step of validating the source computer for authorization to transfer the flash information to the receiving computer.

8. The method as recited in claim 6, wherein the step of flashing the BIOS in the receiving computer if the calculated hash value and the decrypted hash value match includes the steps of:

copying at least a portion of the flash information to a system partition of the receiving computer; and setting a bit in the NVRAM of the source computer to signal a flash.

9. The method as recited in claim 6, wherein the step of flashing the BIOS in the receiving computer if the calculated hash value and the decrypted hash value match includes the steps of:

copying at least a portion of the flash information to a system partition of the receiving computer; and setting a bit in the system partition bootstrap to signal a flash.

10. In a computer system having a receiving computer and a source computer, a method for the remote flashing of the BIOS in the receiving computer comprising the steps of:

initializing the receiving computer to a selected operating state;

enabling the flash bit of the receiving computer to allowing the flashing of the BIOS;

transferring the flash code from the source computer to the receiving computer;

validating the flash code in the receiving computer; and flashing the BIOS in the receiving computer if the flash code is validated.

11. The method as recited in claim 10, wherein said step of initializing the receiving computer to a selected operating state includes the steps of:
- calculating a hash from the bootstrap of the receiving computer;
- validating the bootstrap;
- loading the bootstrap if validated;
- calculating a hash from the system partition files; and
- validating the system partition.

12. The method as recited in claim 11, wherein the step of initializing the receiving computer to a selected operating state includes the step of power cycling the receiving computer.

13. The method as recited in claim 12, further comprising the step of validating the source computer for authorization to transmit the flash code to the receiving computer.

14. The method as recited in claim 13, prior to said step of flashing the BIOS in the receiving computer if the flash code is validated, further comprising the steps of:
- reading the current BIOS flash;
- saving the current BIOS flash;
- re-reading the current BIOS flash; and
- verifying the saved current BIOS flash.

* * * * *